(12) United States Patent
Lindig

(10) Patent No.: US 7,511,250 B2
(45) Date of Patent: Mar. 31, 2009

(54) TRANSPORT SYSTEM

(75) Inventor: Erik Lindig, Kelkheim (DE)

(73) Assignee: Durr Systems GmbH, Stuttgart (DE)

( * ) Notice: Subject to any disclaimer, the term of this patent is extended or adjusted under 35 U.S.C. 154(b) by 258 days.

(21) Appl. No.: 11/298,638

(22) Filed: Dec. 8, 2005

(65) Prior Publication Data

US 2006/0131294 A1     Jun. 22, 2006

Related U.S. Application Data

(63) Continuation of application No. PCT/EP2004/004351, filed on Apr. 24, 2004.

(30) Foreign Application Priority Data

Jun. 13, 2003   (DE)   ................................. 103 26 614

(51) Int. Cl.
*H05B 6/10* (2006.01)
(52) U.S. Cl. .................... 219/647; 219/635; 363/37
(58) Field of Classification Search ................. 219/647, 219/653, 633, 635, 649, 673, 617, 660, 672; 104/130.01, 130.02, 130.03, 130.06, 130.07, 104/139, 293, 290, 282; 307/33, 104; 191/6, 191/33 R; 363/37
See application file for complete search history.

(56) References Cited

U.S. PATENT DOCUMENTS

| | | |
|---|---|---|
| 5,293,308 A | 3/1994 | Boys et al. |
| 5,389,766 A * | 2/1995 | Takahashi et al. ........... 219/635 |
| 5,839,554 A | 11/1998 | Clark |
| 5,855,261 A | 1/1999 | Odachi et al. |
| 6,265,791 B1 | 7/2001 | Eberl et al. |
| 6,425,468 B1 | 7/2002 | Yamamoto et al. |
| 6,515,878 B1 | 2/2003 | Meins et al. |
| 2003/0146062 A1 | 8/2003 | Futschek |

FOREIGN PATENT DOCUMENTS

| | | |
|---|---|---|
| DE | 196 10 289 A1 | 8/1997 |
| DE | 197 35 685 A1 | 2/1999 |
| DE | 100 14 954 A1 | 10/2001 |

OTHER PUBLICATIONS

Russian Office Action mailed Feb. 26, 2008 in corresponding RU Application No. 2006100189.

* cited by examiner

*Primary Examiner*—Quang T Van
(74) *Attorney, Agent, or Firm*—Leydig, Voit & Mayer, Ltd.

(57) ABSTRACT

In order to provide a transport system with a conductor system, which includes at least one supply conductor, which is connected to an energy source, at least one transport carriage movable along a travel path relative to the conductor system and at least one device for the non-contact transmission of energy from the conductor system to the transport carriage, in which transport system the stationary conductor loop has an inductance that is as low as possible and in which ohmic losses are kept as low as possible, it is proposed that the transport system includes at least one induction conductor, which at least in sections is arranged so closely adjacent to the supply conductor that an electric current flowing in the supply conductor generates an induction current in the induction conductor, wherein the induction conductor has at least two end regions, which are short-circuited to one another, and/or wherein the induction conductor is closed in a ring shape.

31 Claims, 13 Drawing Sheets

TRANSPORT SYSTEM

RELATED APPLICATION

This application is a continuation application of PCT/EP2004/004351 filed Apr. 24, 2004, and claims priority to German patent application number 103 26 614.3, filed Jun. 13, 2003, all of which are hereby incorporated by reference.

FIELD OF THE DISCLOSURE

The present invention relates to a transport system, in particular a rail-mounted transport system, e.g. a suspension monorail, which comprises at least one supply conductor, which is connected to an energy source, at least one transport carriage movable along a travel path relative to the conductor system and at least one device for the non-contact transmission of energy from the conductor system to the transport carriage.

BACKGROUND

Such transport systems are known from the prior art.

In particular, known from the prior art are such transport systems, in which the conductor system comprises a supply conductor extending along the travel path and a return conductor, which is connected in series to the supply conductor and extends back along the travel path essentially parallel to the supply conductor. Such a transport system is shown in FIGS. 1 and 2. The conductor system of such a transport system formed from the supply conductor and the return conductor has a high inductance as a result of the comparatively large distance between the supply conductor and the return conductor. If the return conductor is directed back close to a travel rail of the transport system, then eddy currents are induced in the travel rail, which result in current-heat losses.

In other transport systems known from the prior art, the travel rail of the transport system itself is used as return conductor. Such a transport system is shown in FIGS. 3 and 4. In such transport systems, the current flowing in the travel rail is equal to the current in the supply conductor, which results in correspondingly high current-heat losses in the travel rail.

SUMMARY OF THE INVENTION

This object is achieved according to the invention in that the transport system comprises at least one induction conductor, which at least in sections is arranged so closely adjacent to the supply conductor that an electric current flowing in the supply conductor generates an induction current in the induction conductor, wherein the induction conductor has at least two end regions, which are short-circuited to one another, and/or wherein the induction conductor is closed in a ring shape.

This object is achieved according to the invention with a transport system with the features of the preamble of claim 1 in that the transport system comprises at least one induction conductor, which at least in sections is arranged so closely adjacent to the supply conductor that an electric current flowing in the supply conductor generates an induction current in the induction conductor, wherein the induction conductor has at least two end regions, which are short-circuited to one another, and/or wherein the induction conductor is closed in a ring shape.

Because of the presence of the induction conductor, which is arranged in the vicinity of the supply conductor, the inductance of the stationary conductor loop comprising the supply conductor in the transport system according to the invention is reduced. A return conductor directed back parallel to the supply conductor along the travel path of the transport system is not necessary in the transport system according to the invention, and therefore the transport system according to the invention manages with a lower material and assembly expenditure.

Moreover, the current induced in the induction conductor is constantly lower than the current impressed by the supply conductor, as a result of which the current-heat losses arising in the induction conductor are reduced.

In a particular configuration of the transport system according to the invention, it is provided that two end regions of the induction conductor are short-circuited to one another by means of a short-circuit conductor. As a result of this, a short-circuiting of the end regions of the induction conductor to one another is ensured even when the induction conductor is not closed in a ring shape.

The supply conductor of the conductor system preferably comprises a supply conductor travel path section, which runs essentially along the travel path of the transport system.

In this case, it is preferably provided that the induction conductor runs along the supply conductor travel path section at least in sections.

It can additionally be provided that the supply conductor comprises a first supply conductor feed section, which connects the supply conductor travel path section to a first output of the energy source.

In this case, the short-circuit conductor preferably comprises a first short-circuit conductor section, which runs along the first supply conductor feed section at least in sections to reduce the inductance of the conductor arrangement.

A particularly low inductance of the conductor arrangement is achieved if the first supply conductor feed section and the first short-circuit conductor section are run together in a multicore supply cable at least in sections.

It is particularly favourable if the first supply conductor feed section is run in at least two wires of the multicore supply cable, and the first short-circuit conductor section is run in at least one wire of the multicore supply cable, which—viewed in the peripheral direction of the supply cable—is arranged between the two wires, in which the first supply conductor feed section is run.

Moreover, it is favourable if the first short-circuit conductor section is run in at least two wires of the multicore supply cable, and the first supply conductor feed section is run in at least one wire of the multicore supply cable, which—viewed in the peripheral direction of the supply cable—is arranged between the two wires, in which the first supply conductor feed section is run.

In a preferred configuration of the transport system according to the invention, it is additionally provided that the supply conductor comprises a second supply conductor feed section, which connects the supply conductor travel path section to a second output of the energy source.

In this case, the short-circuit conductor preferably comprises a second short-circuit conductor section, which runs along the second supply conductor feed section at least in sections to reduce the inductance of the conductor arrangement.

The inductance of the conductor arrangement is particularly low if the second supply conductor feed section and the second short-circuit conductor section are run together in a multicore supply cable at least in sections.

It is particularly favourable if the second supply conductor feed section is run in at least two wires of the multicore supply cable, and the second short-circuit conductor section is run in at least one wire of the multicore supply cable, which—viewed in the peripheral direction of the supply cable—is arranged between the two wires, in which the second supply conductor feed section is run.

Moreover, it is favourable if the second short-circuit conductor section is run in at least two wires of the multicore supply cable, and the second supply conductor feed section is run in at least one wire of the multicore supply cable, which—viewed in the peripheral direction of the supply cable—is arranged between the two wires, in which the second short-circuit conductor section is run.

In a preferred configuration of the transport system according to the invention it is provided that the first short-circuit conductor section and the second short-circuit conductor section are connected to one another in the vicinity of the connection terminals of the energy source.

In order to keep the necessary length of the short-circuit conductor sections low, it can be provided alternatively hereto that the short-circuit conductor comprises a first short-circuit conductor section and a second short-circuit conductor section, which are connected to one another at a contact point remote from the energy source.

In this case, it is preferably provided that the supply conductor comprises a first supply conductor feed section with a lower section, which runs from the region of the contact point to a first output of the energy source.

Moreover, it is advantageous in this case if the supply conductor comprises a second supply conductor feed section with a lower section, which runs from the contact point to a second output of the energy source.

The inductance of the conductor arrangement comprising the two supply conductor feed sections can be reduced in this path.

The inductance of this conductor arrangement is particularly low if the lower section of the first supply conductor feed section and the lower section of the second supply conductor feed section are run together in a multicore supply cable at least in sections.

The induction conductor of the transport system according to the invention can be configured in one piece, for example.

However, alternatively hereto it can also be provided that the induction conductor comprises several induction conductor sections, which respectively have at least two end regions, wherein at least one end region of a first induction conductor section is electrically conductively connected to at least one end region of a second induction conductor section. Such a configuration of the induction conductor is particularly suitable for a transport system with an extensive and/or branched travel path.

In this case, the at least one end region of the first induction conductor section and the at least one end region of the second induction conductor section can be electrically conductively connected to one another via a separate connection conductor.

However, alternatively or additionally hereto, the at least one end region of the first induction conductor section is electrically conductively connected to the at least one end region of the second induction conductor section via an electrically conductive mounting.

Such an electrically conductive mounting can be formed in particular by a metal construction supporting the travel path.

In a preferred configuration of the transport system according to the invention, it is provided that each end region of each induction conductor section is electrically conductively connected to at least one end region of the same induction conductor section or another induction conductor section.

Moreover, it is preferably provided that the induction conductor and the supply conductor are electrically separated from one another. Therefore, in this case, the induction conductor in particular is not used as return conductor of the conductor system of the transport system.

No more detailed information regarding the configuration of the induction conductor of the transport system according to the invention has been given thus far.

In principle, any material having an adequate electrical conductivity is suitable for production of the induction conductor.

Preferably, a material that is non-ferromagnetic is used for the induction conductor.

Moreover, it is preferably provided that the induction conductor comprises an element, which is configured at least in sections as a profile element, i.e. an element extending in a longitudinal direction having a substantially constant cross-section.

In particularly preferred configurations of the transport system according to the invention, it is provided that at least in sections the profile element has an essentially U-shaped cross-section or an essentially double-T-shaped cross-section.

In particular, it can be provided the supply conductor of the conductor system is arranged preferably essentially centrally between the two legs of a profile element with a U-shaped cross-section.

Moreover, it can be provided that the induction conductor comprises an element, which is configured at least in sections as a travel rail, on which the transport carriage of the transport system is arranged. Therefore, in this configuration of the invention the travel rail of the transport system can be used as its induction conductor, so that it is not necessary to provide a further element as induction conductor in addition to the travel rail.

Alternatively hereto, it can also be provided that the transport system comprises a travel rail other than the induction conductor, on which track rollers of the transport carriage run, and/or a guide rail other than the induction conductor, on which guide rollers of the transport carriage run.

Moreover, it can be provided that the induction conductor comprises an element, which at least in sections is made from aluminium or an aluminium alloy.

In particular, the induction conductor can comprise an element formed from an aluminium profile or an aluminium alloy profile.

In particular this profile element can at the same time serve as a travel rail of the transport system and/or as mounting for the supply conductor of the transport system.

In a preferred configuration of the transport system according to the invention, it is provided that the conductor system of the transport system has no return conductor, and as a result of this a considerable material and assembly expenditure can be saved compared to transport systems with a return conductor.

The energy source of the transport system can comprise in particular a medium frequency generator.

In particular, it can be provided that medium frequency generator feeds a medium-frequency alternating current, e.g. in the frequency range of approximately 15 kHz to approximately 30 kHz, into the supply conductor.

The travel path of the transport system according to the invention can be essentially rectilinear.

However, alternatively hereto it is also possible that the travel path is curved and in particular has several, e.g. essentially quarter-circle-shaped, curves.

The induction conductor of the transport system according to the invention, which preferably runs essentially parallel to the travel path of the transport system, is in these cases likewise preferably curved.

As a result of the curvature of the travel path and the induction conductor it is possible to arrange the end regions of the induction conductor as closely as possible to one another, so that the short-circuit conductor, which short-circuits the end regions of the induction conductor to one another, can be kept as short as possible.

Moreover, it is also possible that the travel path of the transport system according to the invention branches and thus have several travel path sections.

In this case, it is preferably provided that a respective induction conductor section is associated with each of the travel path sections, wherein the induction conductor sections are connected to one another by electrically conductive connection sections such that they are connected in series, and wherein a first end region of a first induction conductor section and a second end region of a second induction conductor section are short-circuited to one another by a short-circuit conductor.

Moreover, it is preferably provided in this case that a respective supply conductor section is associated with each of the travel path sections, wherein the supply conductor sections are connected to one another by electrically conductive connection sections such that they are connected in series in the same sequence as the induction conductor sections, which are respectively associated with the same travel path sections.

Further features and advantages of the invention are the subject of the following description and the drawing representing practical examples.

BRIEF DESCRIPTION OF THE DRAWINGS

Identical or functionally equivalent elements are given the same reference numerals in all figures.

DETAILED DESCRIPTION OF THE INVENTION

Figure 1:
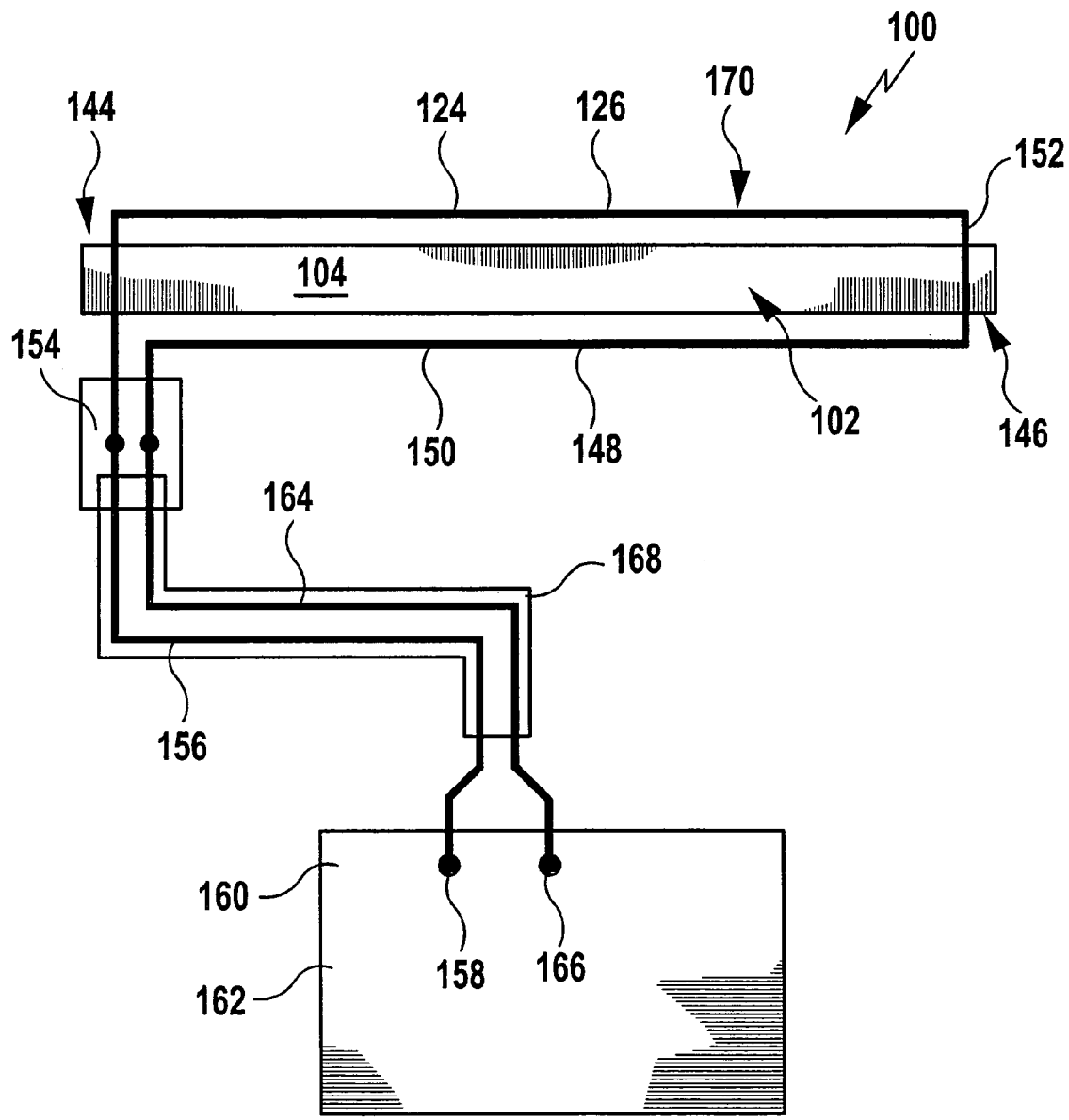
FIG. 1 is a schematic representation of a transport system according to the prior art, the conductor system of which comprises a supply conductor extending along a travel path of the transport system and a return conductor extending along the travel path.
Figure 2:
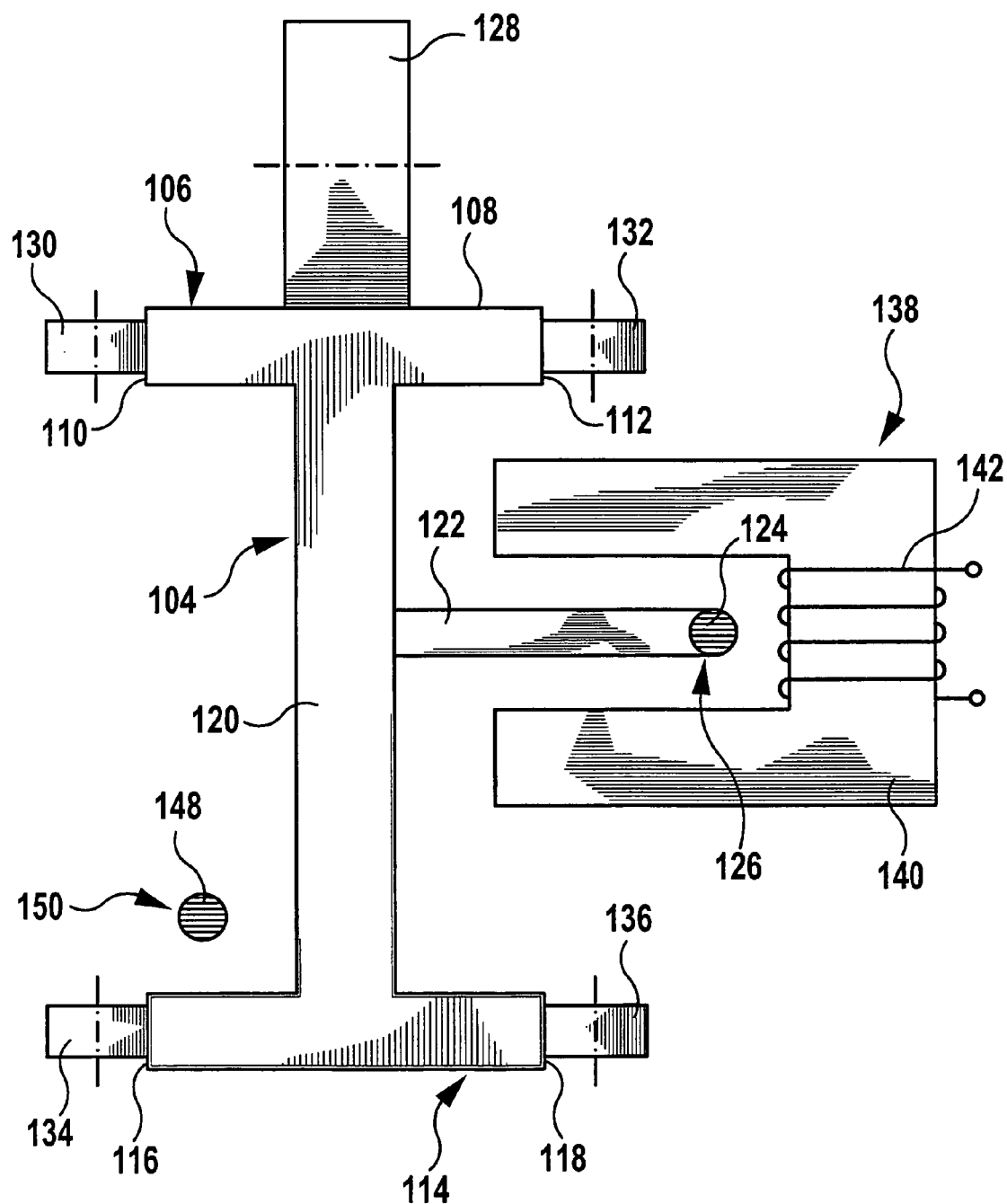
FIG. 2 shows a schematic cross-section through the travel path of the transport system from FIG. 1 and an energy transmission unit of a transport carriage arranged on the travel path.

A transport system according to the prior art shown in FIGS. 1 and 2 and given the overall reference 100, which is configured in particular as a suspension monorail, comprises a linear travel path 102 with a travel rail 104 extending along the travel path.

As may best be seen from FIG. 2, the travel rail 104 has an essentially double-T-shaped cross-section and comprises an upper flange 106 with an upper, essentially plane running surface 108 and with two lateral guide surfaces 110 and 112 as well as a lower flange 114 with two lateral guide surfaces 116 and 118.

The two flanges are connected to one another at their opposing sides via a vertical web 120, the walls of which are plane and run parallel to the longitudinal direction of the travel rail.

A supply conductor support 122, which is formed from an electrically insulating material and which supports a supply conductor travel path section 124 of a supply conductor 126 on its end remote from the web 120, projects from a side wall of the web 120 between the two flanges 106 and 114.

A support roller 128 of a transport carriage of the transport system 100 runs along on the upper running surface 108 of the travel rail 104.

Apart from the support roller 128, FIG. 2 shows of this transport carriage only lateral guide rollers 130, 132, 134 and 136, which run on the lateral guide surfaces 110, 112, 116 and 118 respectively, and also an energy transmission unit 138, which comprises, for example, a current collector 140, which is configured as a U-shaped ferrite core and on which a conductor coil 142 is arranged, which is connected to a current collector electronic circuit (not shown in FIG. 2) for conversion of an alternating current induced in the conductor coil 142 into a direct current voltage.

The supply conductor travel path section 124 of the supply conductor 126 penetrates into the U-shaped current collector 140 of the energy transmission unit 138 without touching this.

As is best seen from FIG. 1, the supply conductor travel path section 124 runs from a first end region 144 of the travel rail 104 parallel to the travel rail 104 to a second end region 146 of the travel rail 104, from which a return conductor travel path section 148 of a return conductor, given the overall reference 150, runs back along the travel rail 104 to the first end region 144 of the travel rail 104. In the second end region 146 the supply conductor 126 and the return conductor 150 are connected to one another via a connection section 152.

As may be seen from FIG. 2, the return conductor travel path section 148 of the return conductor 150 is arranged on the side of the travel rail 104 facing apath from the supply conductor travel path section 124.

However, alternatively hereto, it could also be provided that the return conductor travel path section 148 is arranged on the same side of the travel rail 104 as the supply conductor travel path section 124.

The end of the supply conductor travel path section 124 lying in the first end region 144 of the travel rail 104 is directed into a connection box 154, and there is connected to a supply conductor feed section 156, which connects the supply conductor travel path section 124 to a first output 158 of a medium frequency generator 162 serving as energy source 160 of the transport system 100.

The end of the return conductor travel path section 148 lying in the first end region 144 of the travel rail 104 is also directed into the connection box 154, and there is connected to a return conductor feed section 164, which connects the return conductor travel path section 148 to second output 166 of the medium frequency generator 162.

The supply conductor feed section 156 and the return conductor feed section 164 are run together in a multicore supply cable 168.

If a medium-frequency alternating current (generally in the range of approximately 15 kHz to approximately 30 kHz) is fed into the supply conductor 126 and the return conductor 150 by means of the medium frequency generator 162, then this medium-frequency alternating current generates a correspondingly time-varying magnetic flux in the current collector 140 of the energy transmission unit 138 of the transport carriage, so that an alternating current can be induced in the conductor coil 142 and can be converted with the current collector electronic circuit (not shown) into a direct current voltage for the purposes of driving and controlling the transport carriage.

The conductor system 170 of this transport system 100 formed from the supply conductor 126 and the return conductor 150 has a high inductance because of the comparatively large distance between the supply conductor 126 and the return conductor 150. While, as has already been discussed, the return conductor 150 can also be arranged on the same side of the travel rail 104 as the supply conductor 126, a minimum distance between the supply conductor 126 and the return conductor 150 is predetermined by the size of the U-shaped current collector 140.

If the return conductor 150 is run back close to the travel rail 104, which can be formed in particular from an aluminium profile, then its inductance is reduced. However as a result of the guidance close to the travel rail 104, eddy currents are induced in the travel rail 104, which lead to current-heat losses.

Figure 3:
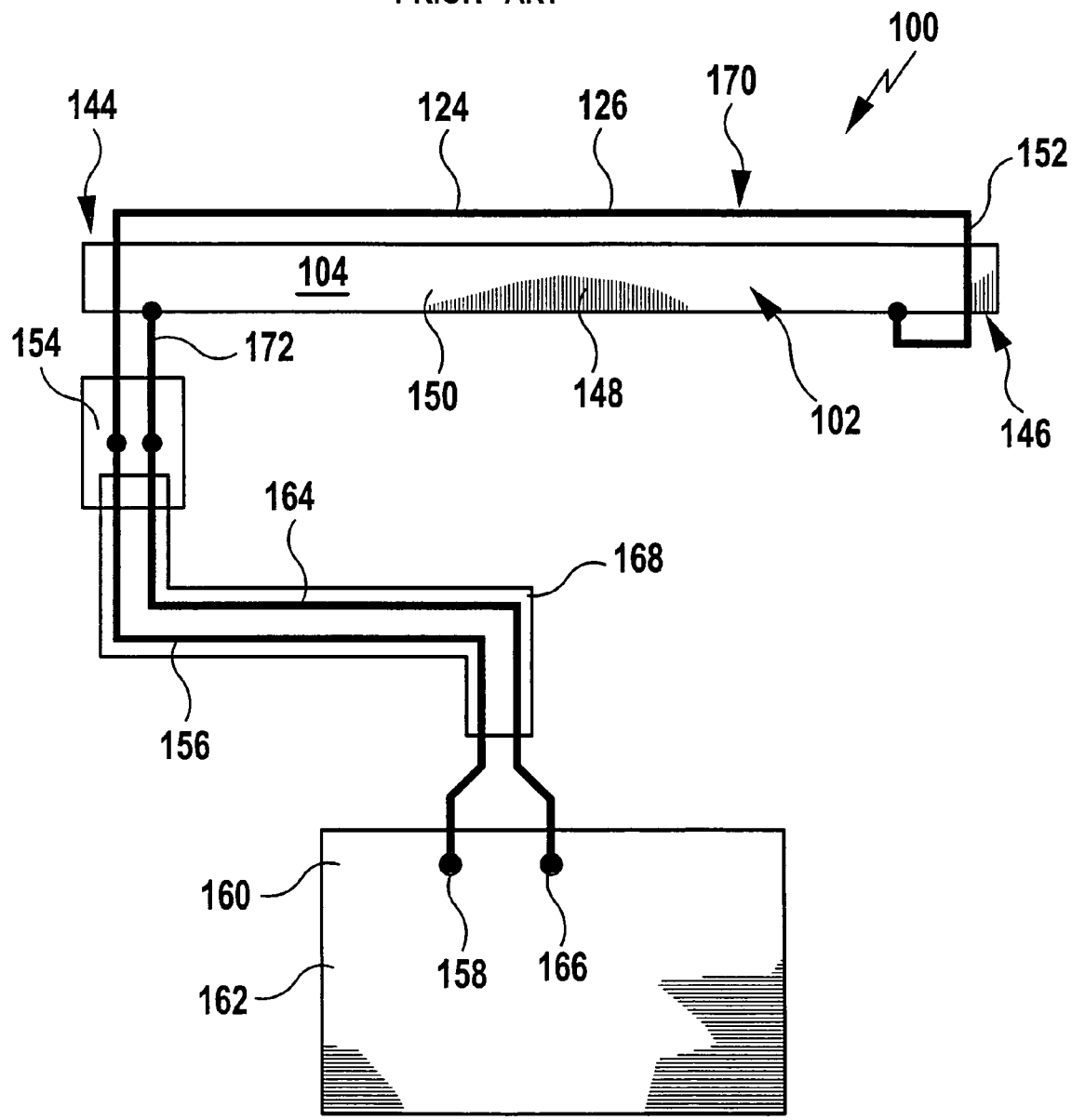
FIG. 3 is a schematic representation of a further transport system according to the prior art, the conductor system of which comprises a supply conductor extending along a travel path of the transport system and a travel rail serving as return conductor.
Figure 4:
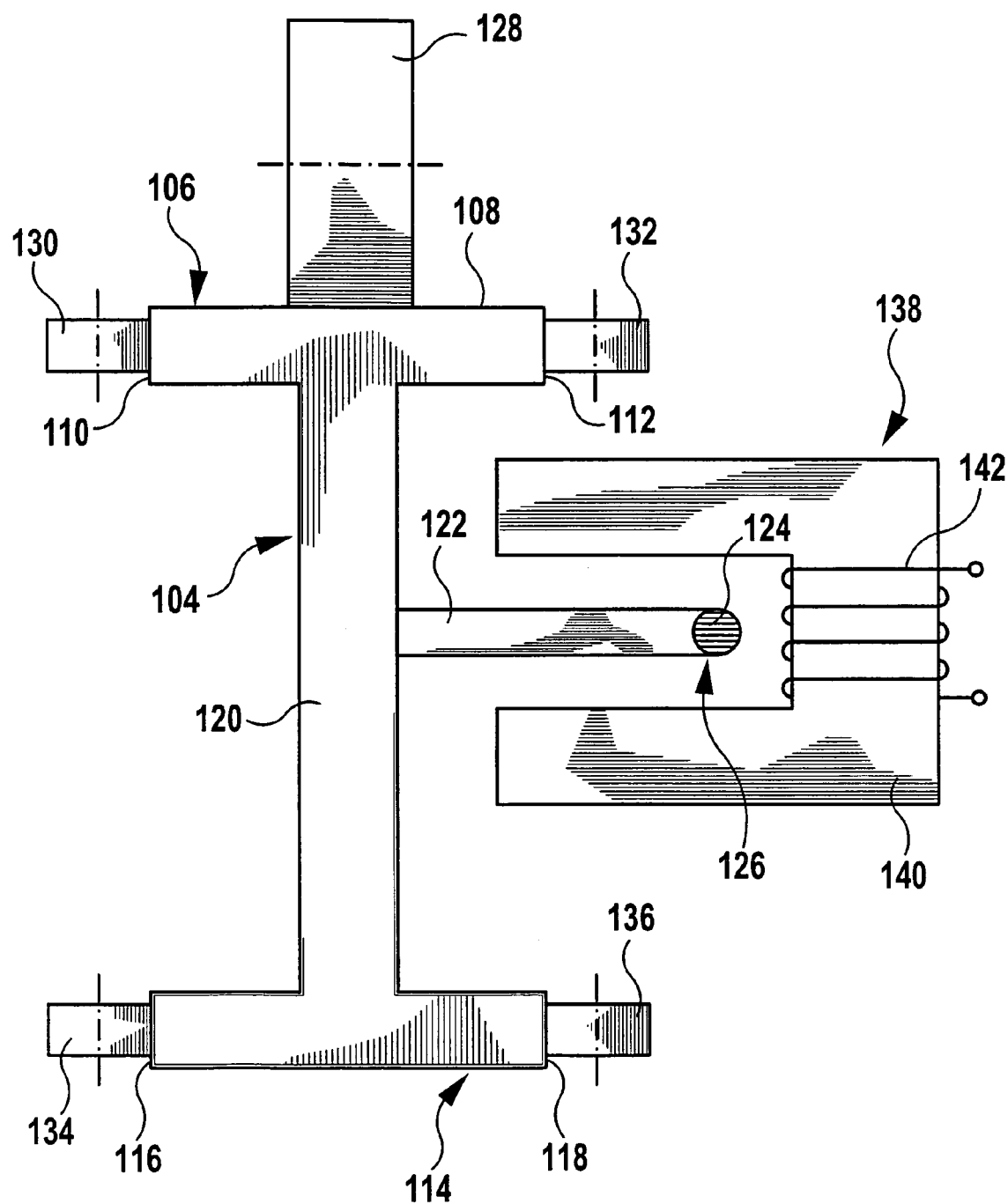
FIG. 4 shows a schematic cross-section through the travel path of the transport system from FIG. 3 and through an energy transmission unit of a transport carriage arranged on the travel path.

A further embodiment of a transport system 100 according to the prior art shown in FIGS. 3 and 4 differs from the above-described embodiment of a transport system 100 only in that the travel rail 104 is itself used as return conductor travel path section 148. For this, the end of the supply conductor travel path section 124 in the second end region 146 of the travel rail 104 is connected to the travel rail 104 via the connection section 152.

Moreover, the first end region 144 of the travel rail 104 is connected to the return conductor feed section 164 via a connection section 172, which is directed into the connection box 154.

Therefore, in this embodiment the non-insulated travel rail 104, which can be configured in particular as an aluminium profile, is used for the return of the stationary conductor loop.

The current in the travel rail 104 is equal to the current in the supply conductor 126.

Otherwise, the embodiment of a transport system 100 according to the prior art shown in FIGS. 3 and 4 is the same with respect to its structure and function as the transport system 100 shown in FIGS. 1 and 2, and reference is made to the above description thereof on this basis.

Figure 5:
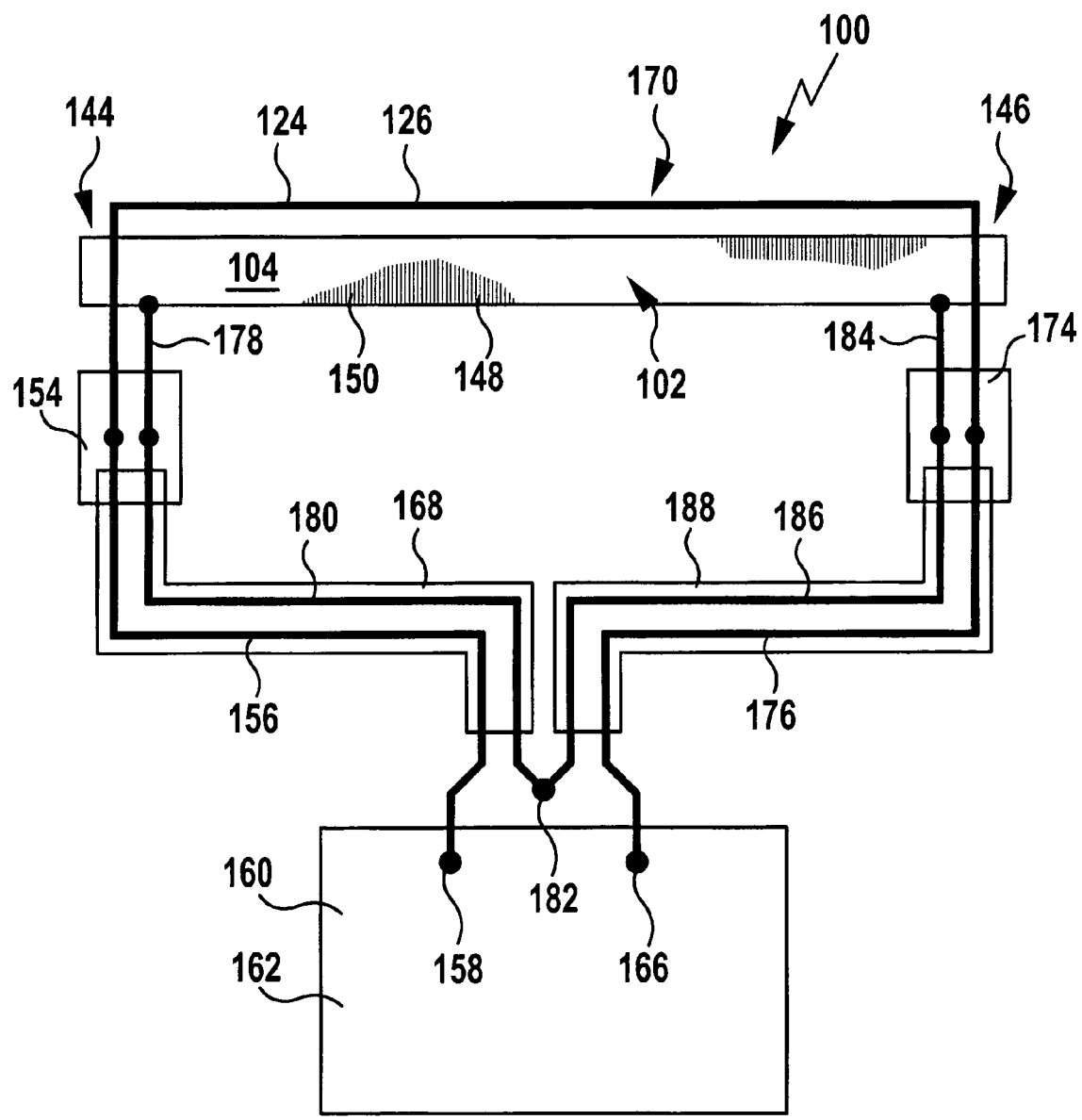
FIG. 5 is a schematic representation of a transport system according to the invention, the conductor system of which comprises a supply conductor extending along a travel path of the transport system and which comprises an induction conductor, which is arranged adjacent to the supply conductor and the end regions of which are short-circuited to one another.
Figure 6:
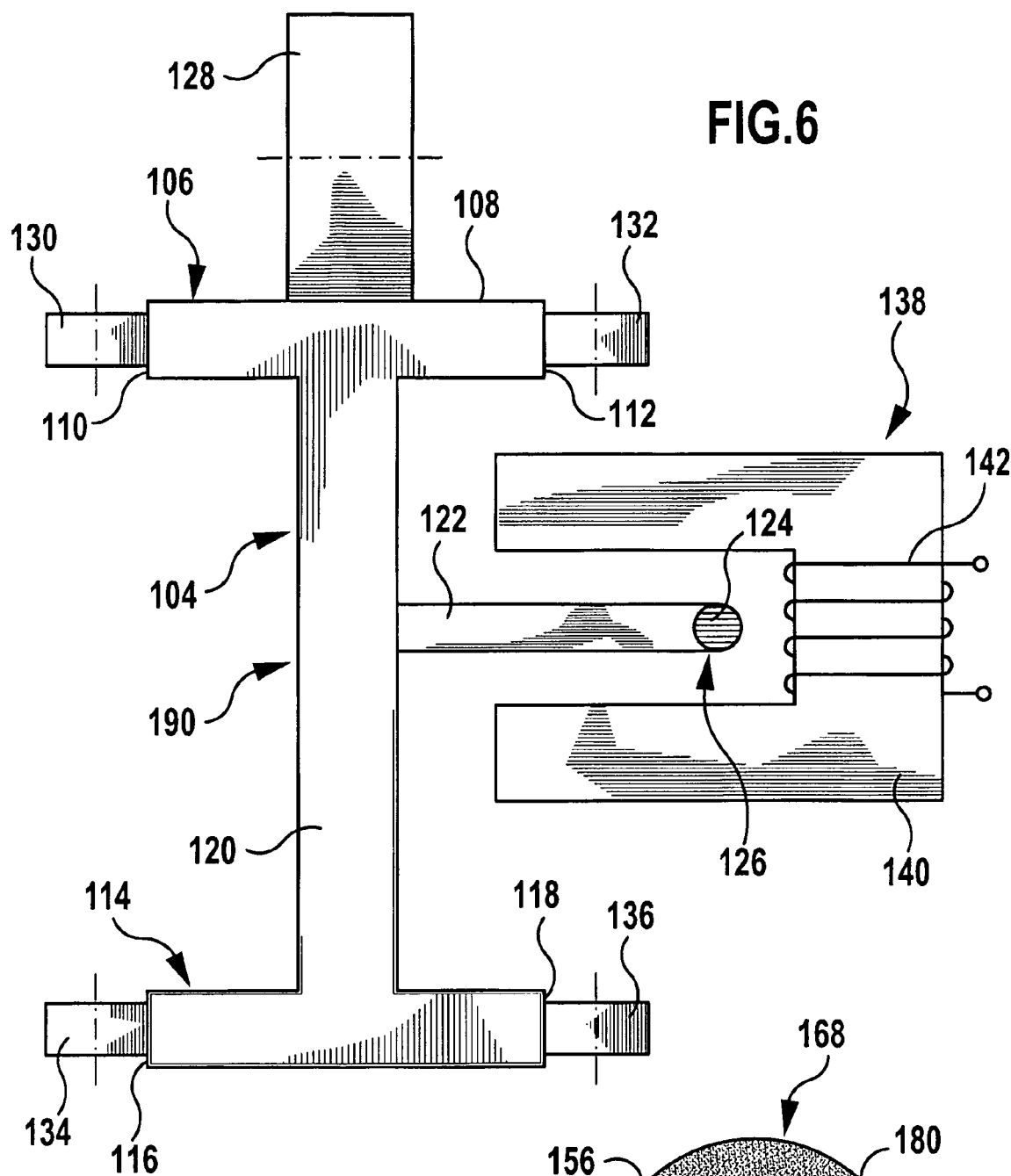
FIG. 6 shows a schematic cross-section through the travel path of the transport system from FIG. 5 and through an energy transmission unit of a transport carriage arranged on the travel path.
Figure 7:
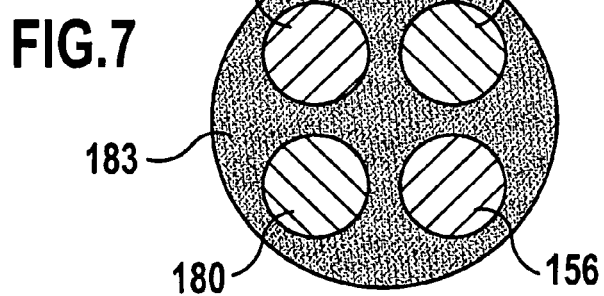
FIG. 7 shows a schematic cross-section through a multi-core supply cable of the transport system from FIG. 5.

A first embodiment of a transport system 100 according to the invention shown in FIGS. 5 to 7 differs from the transport system 100 shown in FIGS. 1 and 2 in that no return conductor 150 is present.

Instead, the supply conductor travel path section 124 in the second end region 146 of the travel rail 104 is led into a second connection box 174 and there is connected to a second supply conductor feed section 176, which connects the supply conductor travel path section 124 to the second output 166 of the medium frequency generator 162 serving as energy source 160 of the transport system 100.

In the first end region 144 of the travel rail 104 the supply conductor travel path section 124 is led into a first connection box 154 and there is connected to a first supply conductor feed section 156, which connects the supply conductor travel path section 124 to the first output 158 of the medium frequency generator 162.

In this embodiment, the travel rail 104 is electrically separated from the supply conductor 126.

The first end region 144 of the travel rail 104 is connected via a first connection section 178, which is led into the first connection box 154, to a first short-circuit conductor section 180, which connects the first connection section 178 to a contact point 182 arranged in the vicinity of the connection terminals of the medium frequency generator 162.

A large portion of the first short-circuit conductor section 180 is run together with a large portion of the first connection conductor feed section 156 in a multicore first supply cable 168, the cross-section of which is shown schematically in FIG. 7.

As may be seen from the cross-section of FIG. 7, the first connection conductor feed section 156 run in the first supply cable 168 comprises two wires, which are diametrically opposed to one another in the multicore first supply cable 168.

Moreover, the first short-circuit conductor section 180 run in the first supply cable 168 comprises two wires, which are likewise diametrically opposed to one another in the first supply cable 168 and—viewed in the peripheral direction of the first supply cable 168—are respectively arranged between two wires of the first connection conductor feed section 156, so that the wires of the first supply conductor feed section 156 and the first short-circuit conductor section 180 are respectively alternately arranged consecutively in the peripheral direction of the first supply cable 168.

All wires of the first supply cable 168 are embedded into an insulation material 182.

The above-described arrangement of the wires of the first connection conductor feed section 156 and the first short-circuit conductor section 180 in the first supply cable 168 results in the first supply cable 168 having a particularly low inductance.

As may be seen from FIG. 5, the second end region 146 of the travel rail 104 is connected via a second connection section 184, which is led into the second connection box 174, to a second short-circuit conductor section 186, which connects the second connection section 184 to the contact point 182 arranged in the vicinity of the connection terminals of the medium frequency generator 162.

A large portion of the second short-circuit conductor section 186 is run together with a large portion of the second supply conductor feed section 156 in a multicore second supply cable 188, which is configured in the same manner as the above-described first supply cable 168 shown in FIG. 7.

Therefore, the first end region 144 and the second end region 146 of the travel rail 104 are short-circuited to one another via the first connection section 178, the first short-circuit conductor section 180, the contact point 182, the second short-circuit conductor section 186 and the second connection section 184.

In this short-circuited power circuit an induction current flows, which is induced by the current in the supply conductor 126, i.e. in its supply conductor travel path section 124 and in its supply conductor feed sections 156 and 176, in the travel rail 104 and the short-circuit conductor sections 180, 186.

The travel rail 104 thus forms an induction conductor 190, the end regions 144 and 146 of which are short-circuited to one another via a short-circuit conductor 192, which comprises the first short-circuit conductor section 180, the second short-circuit conductor section 186 and the contact point 182.

In this conductor arrangement the inductance of the supply conductor 126, into which the medium-frequency current is fed by the medium frequency generator 162, assumes a minimum.

The travel rail 104 is formed from an electrically conductive material.

Moreover, the travel rail 104 is preferably formed from a non-ferromagnetic material.

In particular it can be provided that the travel rail 104 is formed from aluminium or an aluminium alloy.

Otherwise, the first embodiment of a transport system 100 according to the invention shown in FIGS. 5 to 7 is the same with respect to its structure and function as the transport system shown in FIGS. 1 and 2, and reference is made to the above description thereof on this basis.

Compared to the transport system 100 shown in FIGS. 1 and 2, the transport system 100 according to the invention has the advantage that the return conductor 150 of the conductor system 170 is omitted and therefore does not have to be run back in the vicinity of the travel rail 104 and/or in the vicinity of the supply conductor 126 along the travel path 102 in order to reduce the inductance of the return conductor.

Because of the omission of the return conductor 150, no additional losses occur in the travel rail 104 through eddy currents induced therein as a result of the magnetic field of the return conductor 150.

The embodiment of a transport system 100 shown in FIGS. 5 to 7 is thus distinguished in relation to the transport system 100 shown in FIGS. 1 and 2 by a lower material and assembly expenditure, since laying of a return conductor is not necessary. Moreover, the stationary conductor loop of the transport system 100 shown in FIGS. 5 to 7 has a lower inductance than in the case of the transport system 100 shown in FIGS. 1 and 2.

Compared to the transport system 100 shown in FIGS. 3 and 4 the embodiment of a transport system 100 according to the invention shown in FIGS. 5 to 7 has the advantage that the current induced in the short-circuited travel rail 104 is constantly lower than the current impressed by the medium frequency generator 162 and therefore constantly lower than the current, which in the transport system 100 shown in FIGS. 3 and 4 flows through the travel rail 104, which is used there as return conductor 150. As a result, the current-heat losses occurring in the travel rail 104 in the embodiment according to the invention shown in FIGS. 5 to 7 are lower than in the transport system 100 shown in FIGS. 3 and 4.

Figure 8:
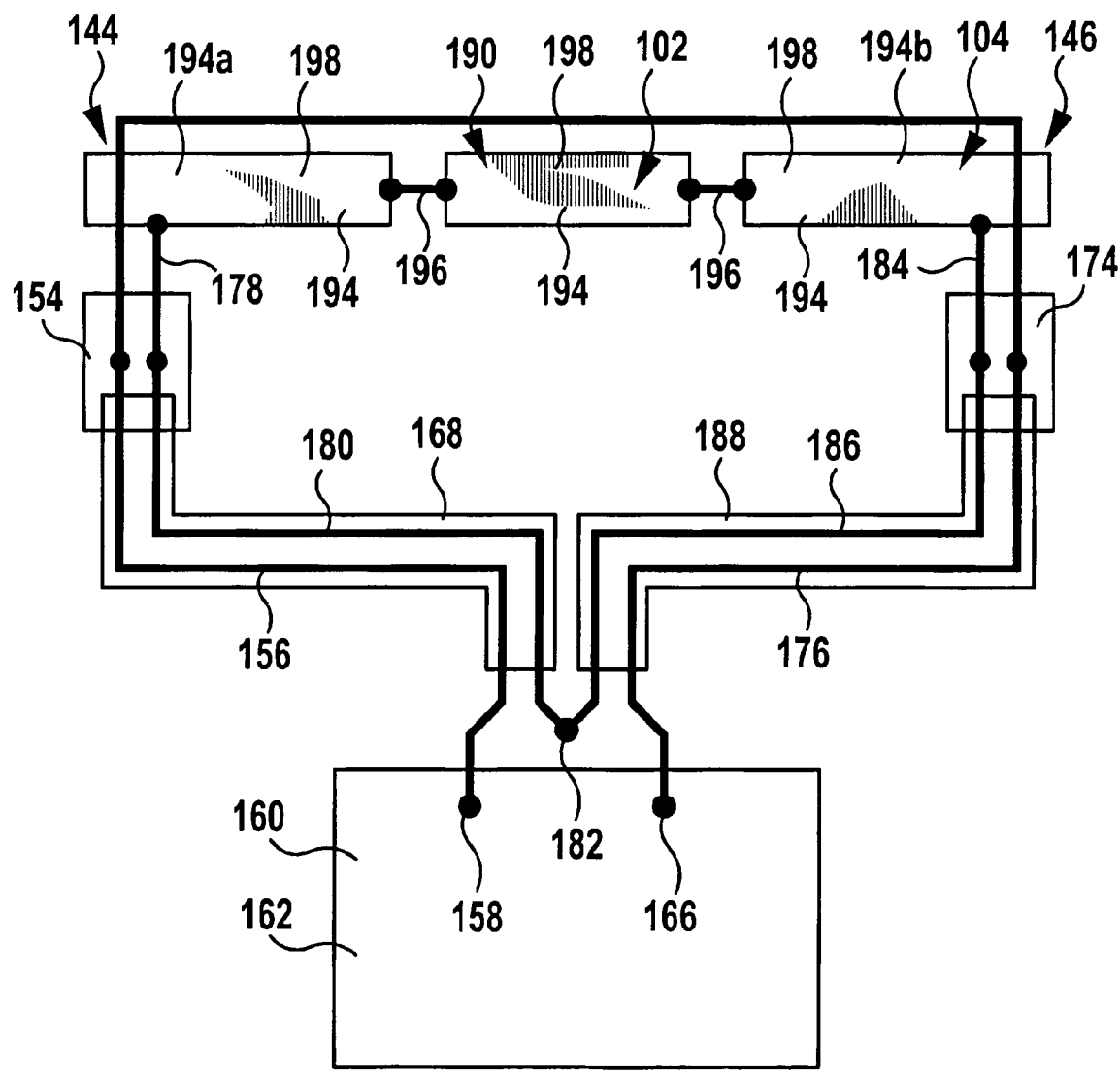
FIG. 8 is a schematic representation of a second embodiment of the transport system according to the invention, the induction conductor of which comprises a plurality of induction conductor sections, which are electrically conductively connected to one another.

A second embodiment of a transport system 100 according to the invention shown in FIG. 8 differs from the first embodiment shown in FIGS. 5 to 7 merely in that the travel rail 104 is not configured in one piece, but comprises several travel rail sections 194, which are arranged consecutively along the travel path 102, wherein consecutive travel rail sections 194 are respectively connected electrically conductively to one another.

This electrically conductive connection of consecutive travel rail sections 194 is shown in FIG. 8 by connection lines 196.

The electrically conductive connection of the travel rail sections 194 to one another can be achieved by separate connection lines.

Alternatively or additionally hereto, however, it is also possible that the electrically conductive connection between the consecutive travel rail sections 194 is achieved by an electrically conductive mounting, on which both of the travel rail sections 194 to be respectively connected electrically conductively to one another are held.

Such a mounting can be formed in particular by a steel construction supporting the travel path 102.

As may be seen from FIG. 8, the first travel rail section 194a containing the first end region 144 of the travel rail 104 is connected to the first short-circuit conductor section 180 via the first connection section 178, while the last travel rail section 194b containing the second end region 146 of the travel rail 104 is connected to the second short-circuit conductor section 186 via the second connection section 184.

Thus, in this embodiment the travel rail sections 194 respectively form an induction conductor section 198, and the induction conductor sections 198 together with the connection lines 196 connecting the induction conductor sections 198 to one another form the induction conductor 190 of the transport system 100.

Otherwise, the second embodiment of a transport system 100 shown in FIG. 8 is the same with respect to its structure and function as the first embodiment shown in FIGS. 5 to 7, and reference is made to the above description thereof on this basis.

Figure 9:
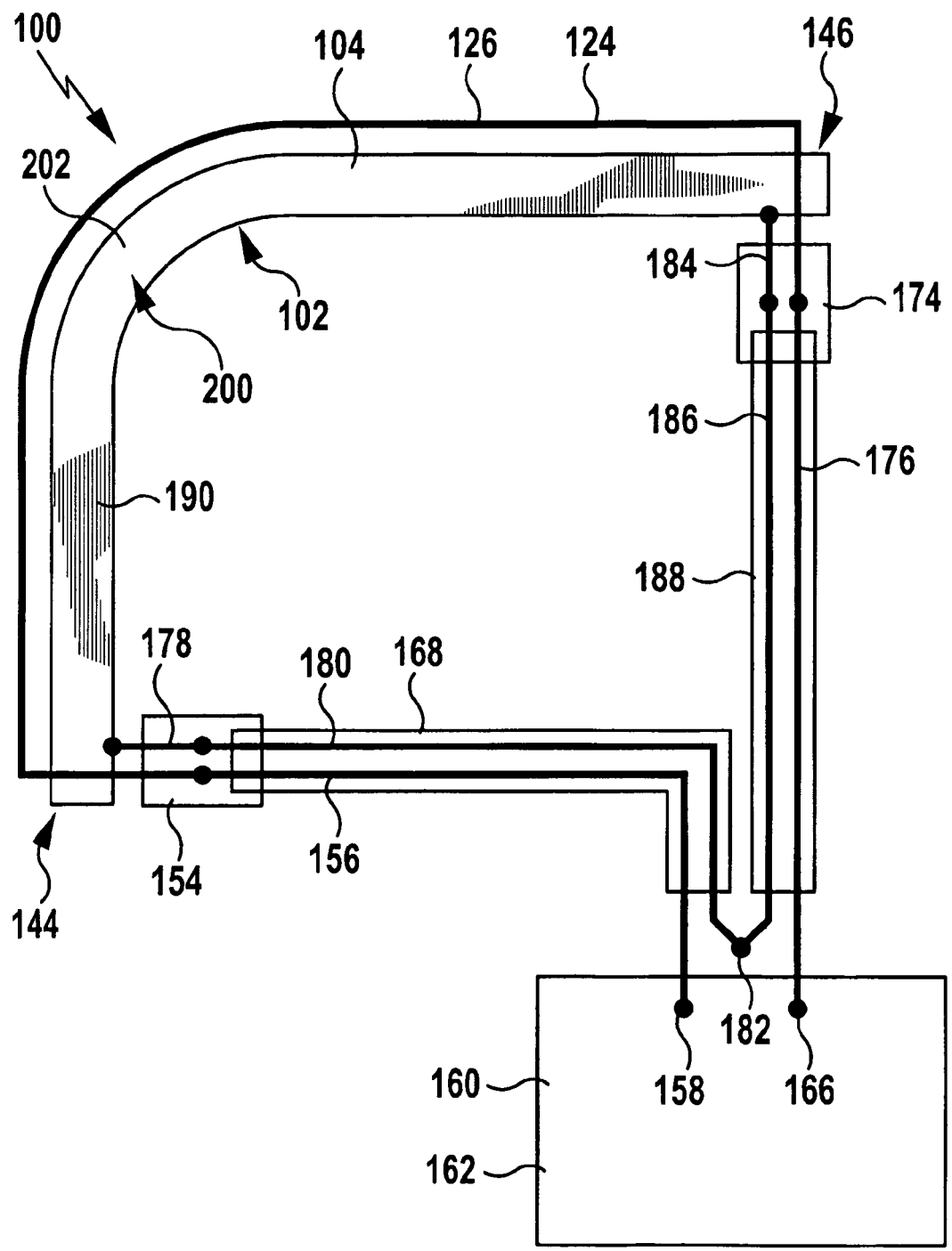
FIG. 9 is a schematic representation of a third embodiment of the transport system according to the invention, the induction conductor of which comprises a quarter-circle-shaped section.

A third embodiment of a transport system 100 according to the invention shown in FIG. 9 differs from the first embodiment shown in FIGS. 5 to 7 merely in that the travel path 102 is not rectilinear, but comprises a curve with an essentially quarter-circle-shaped travel path section 200.

In this embodiment, the travel rail 104 also comprises a section 202 curved essentially in a quarter-circle shape. As a result of the arc-shaped curvature of the travel path 102 and the travel rail 104 the end regions 144 and 146 of the travel rail 104 lie more closely adjacent to one another than in the case of the above-described first embodiment, and therefore the length of the supply cables 168, 188 can be reduced, in particular when the medium frequency generator 162 serving as energy source 160 of the transport system 100 is arranged approximately in the centre between the two end regions 144 and 146.

As in the case of the above-described second embodiment, it can also be provided with this embodiment that the travel rail 104 is divided into several travel rail sections 194 arranged consecutively along the travel path 102.

Otherwise, the third embodiment shown in FIG. 9 is the same with respect to its structure and function as the first embodiment shown in FIGS. 5 to 7, and reference is made to the above description thereof on this basis.

Figure 10:
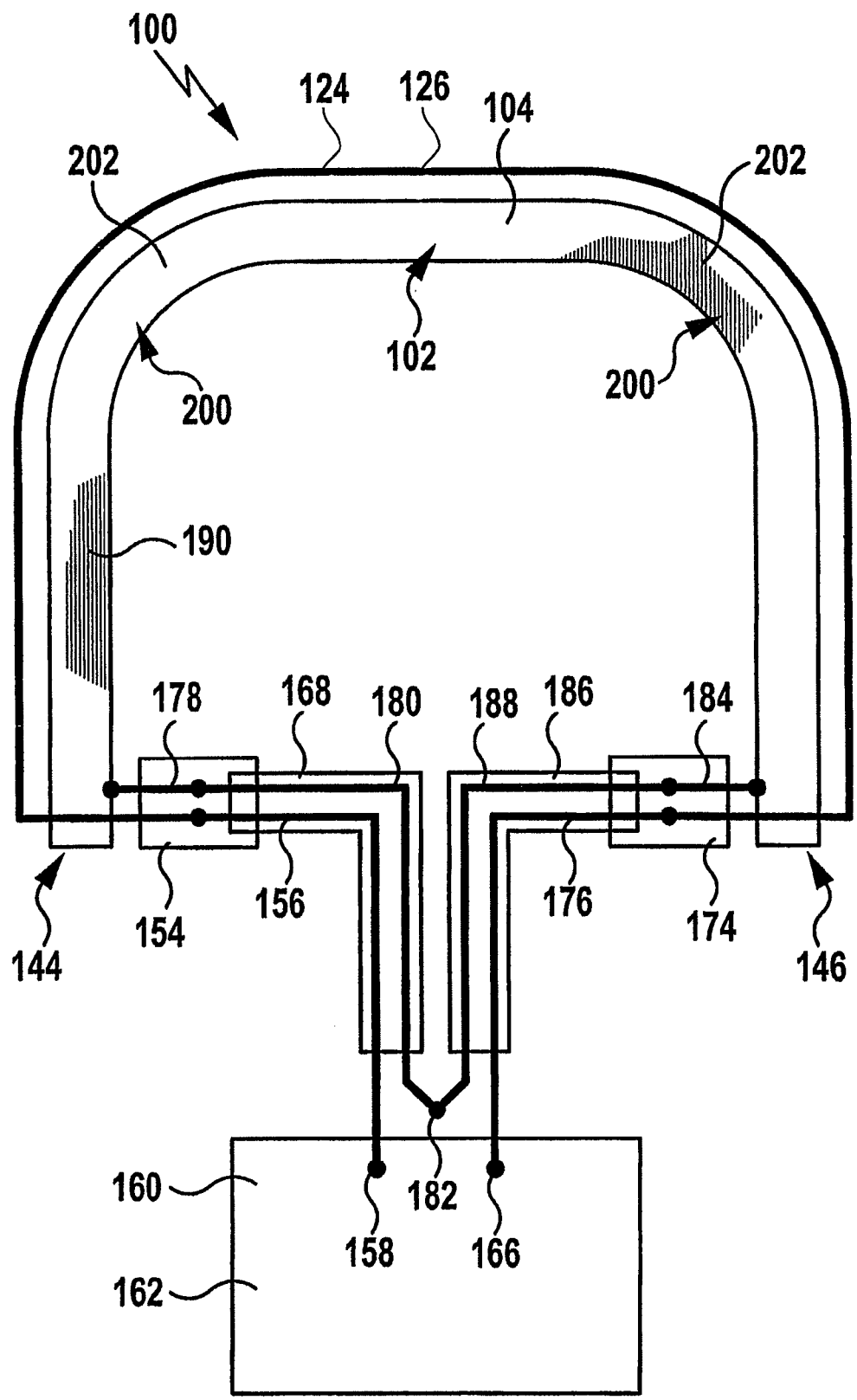
FIG. 10 is a schematic representation of a fourth embodiment of the transport system according to the invention, the induction conductor of which comprises two quarter-circle-shaped sections.

A fourth embodiment of a transport system 100 according to the invention shown in FIG. 10 differs from the above-described third embodiment in that the travel path 102 not only comprises a single quarter-circle-shaped travel path section 200, but two such quarter-circle-shaped travel path sections 200, which are curved in the same direction, so that the travel path 102 has the shape of a U overall.

In this embodiment, the travel rail 104 also has two essentially quarter-circle-shaped travel rail sections 202 curved in the same direction.

This configuration of the travel path 102 and the travel rail 104 results in the end regions 144, 146 of the travel rail 104 lying even more closely adjacent to one another than in the third embodiment, and thus the length of the supply cables 168, 188 can be kept even shorter, in particular when the medium frequency generator 162 serving as energy source 160 of the transport system 100 is arranged in the centre between the end regions 144, 146.

Otherwise, the fourth embodiment of a transport system 100 according to the invention shown in FIG. 10 is the same with respect to its structure and function as the first embodiment shown in FIGS. 5 to 7, and reference is made to the above description thereof on this basis.

Figure 11:
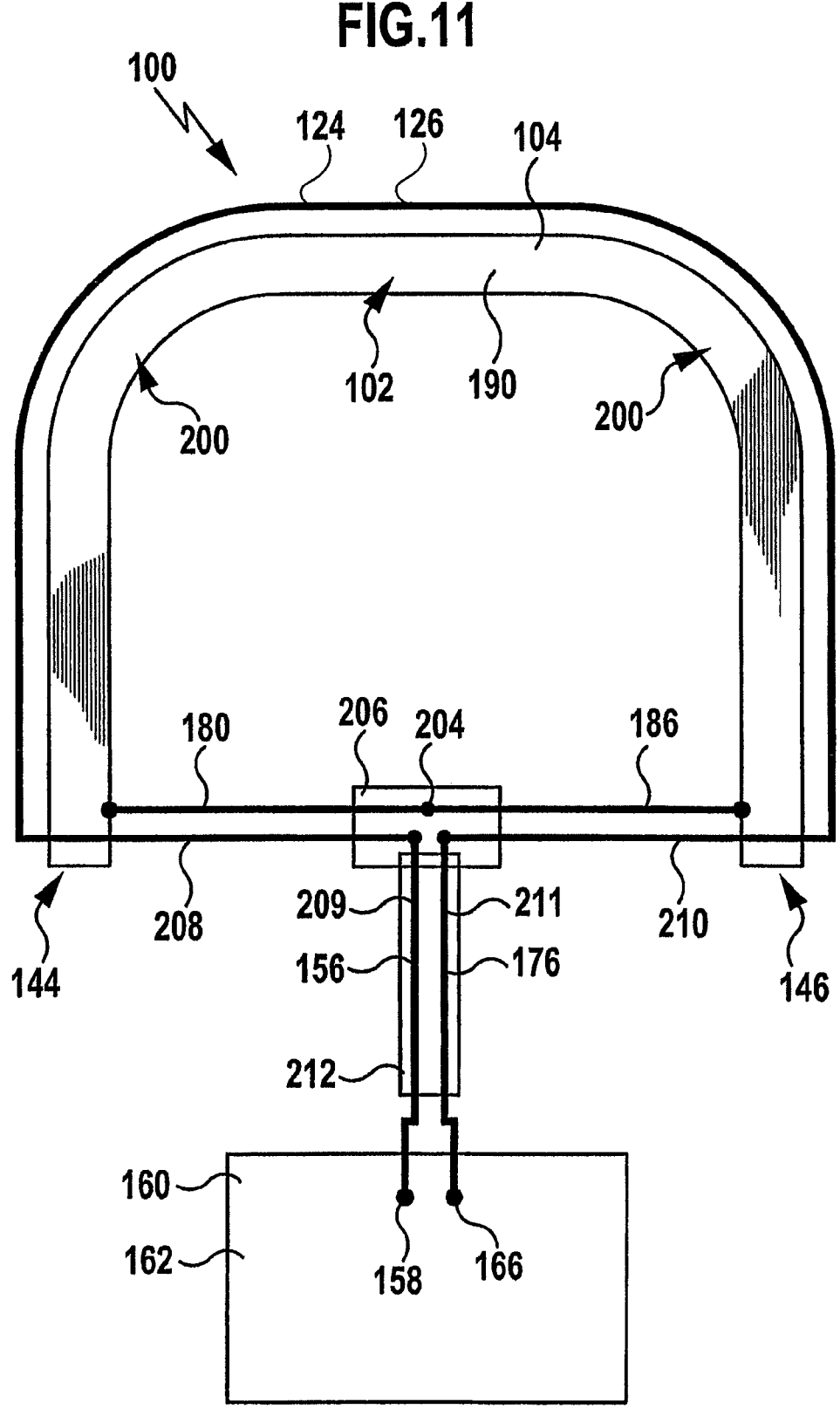
FIG. 11 is a schematic representation of a fifth embodiment of the transport system according to the invention, the induction conductor of which comprises two quarter-circle-shaped sections, wherein the end regions of the induction conductor are connected to one another by two short-circuit conductor sections, which are connected to one another at a contact point remote from a generator of the transport system.

A fifth embodiment of a transport system 100 according to the invention shown in FIG. 11 differs from the fourth embodiment shown in FIG. 10 in that the first short-circuit conductor section 180 and the second short-circuit conductor section 186 are not connected to one another at a contact point 182 lying in the vicinity of the outputs 158, 166 of the medium frequency generator 162, but instead are connected to one another at a contact point 204 arranged centrally between the end regions 144, 146 of the travel rail 104.

The contact point 204 is arranged in a connection box 206.

The first end region 144 of the travel rail 104 is connected to the contact point 204 via the first short-circuit conductor section 180. The second end region 146 of the travel rail 104 is connected to the contact point 204 via the second short-circuit conductor section 186.

The end of the supply conductor travel path section 124 located in the first end region 144 of the travel rail 104 is connected via a first connection section 208, which is directed into the connection box 206 and runs close to the first short-circuit conductor section 180 and essentially parallel thereto, to a lower section 209 of the first supply conductor feed section 156, which connects the first connection section 208 to the first output 158 of the medium frequency generator 162 serving as energy source 160 of the transport system 100.

The end of the supply conductor travel path section 124 located in the second end region 146 of the travel rail 204 is connected via a second connection section 210, which is directed into the connection box 206 and runs close to the second short-circuit conductor section 186 and essentially parallel thereto, to a lower section 211 of the second supply conductor feed section 176, which connects the second connection section 210 to the second output 166 of the medium frequency generator 162.

In this embodiment, the lower section 209 of the first supply conductor feed section 156 and the lower section 211 of the second supply conductor feed section 176 are run together in a multicore supply cable 212.

In this embodiment, the lengths of the short-circuit conductor sections 180 and 186 can also be kept short when the medium frequency generator 162 is not arranged essentially centrally between the end regions 144, 146 of the travel rail 104, but at another location.

Otherwise, the fifth embodiment shown in FIG. 11 is the same with respect to its structure and function as the fourth embodiment of the transport system 100 shown in FIG. 10, and reference is made to the above description thereof on this basis.

Figure 12:
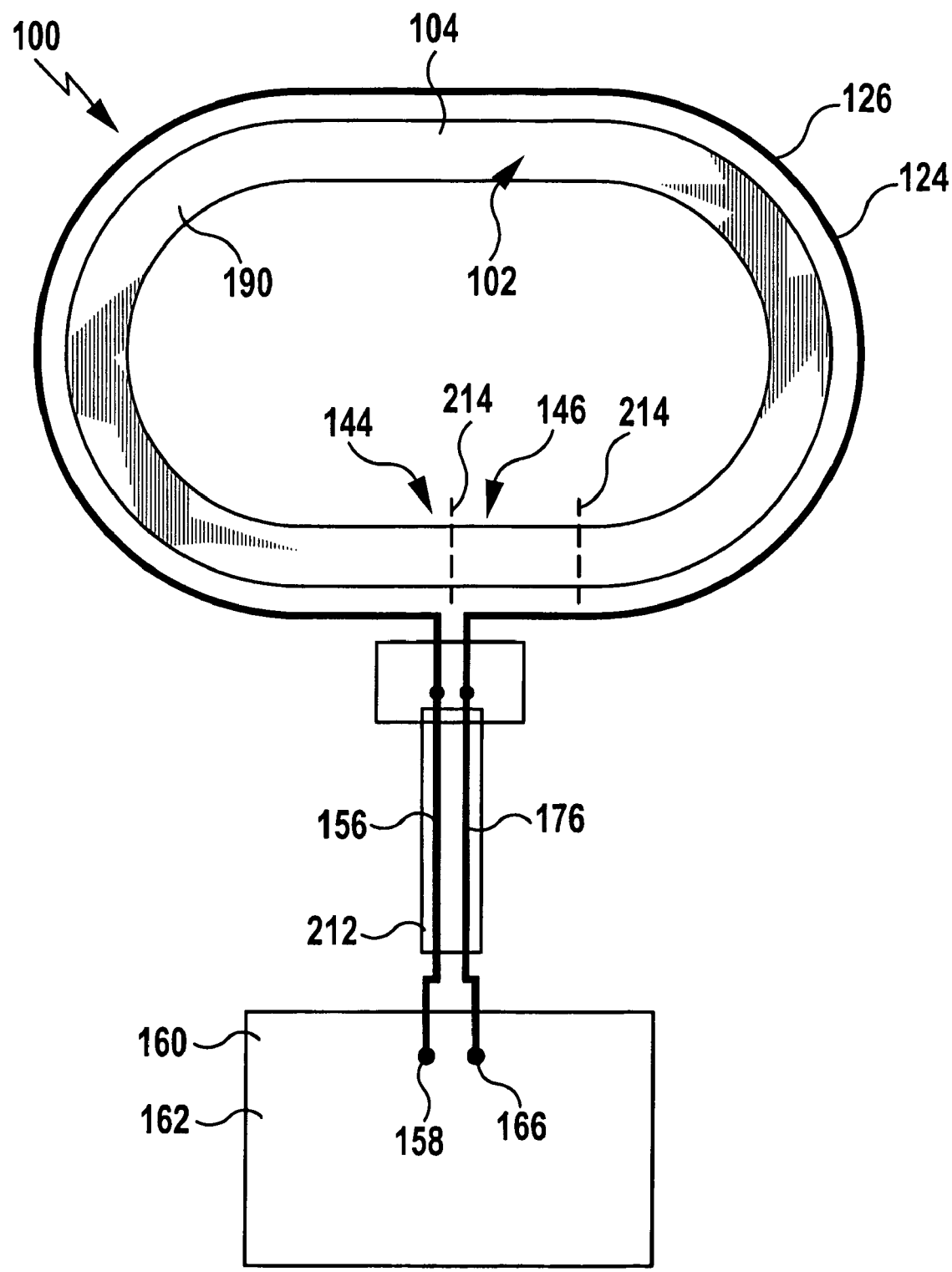
FIG. 12 is a schematic representation of a sixth embodiment of the transport system according to the invention, which comprises a closed-ring-shaped induction conductor.

A sixth embodiment of a transport system 100 according to the invention shown in FIG. 12 differs from the fifth embodiment shown in FIG. 11 in that the travel path 102 is not U-shaped, but closed in a ring shape.

Accordingly, the travel rail 104 of this embodiment is also closed in a ring shape.

The travel rail 104 closed in a ring shape can be divided at any location, e.g. at the location given the reference 214 in FIG. 12, ideally into a first end region 144 and a second end region 146, which electrically conductively stand in contact with one another along the separating face 214 and are therefore short-circuited to one another.

Thus, in the case of this embodiment no short-circuit conductor 192 is necessary to short-circuit the end regions 144, 146 of the travel rail 104 serving as induction conductor 190 to one another.

The supply conductor travel path section 124 runs along the travel path 102, but is not closed in a ring shape. Instead, one of the ends of the supply conductor travel path section 124 is directed into a connection box 216 and there connected to the first connection conductor feed section 156, which connects the supply conductor travel path section 124 to the first output 158 of the medium frequency generator 162 serving as energy source 160 of the transport system 100.

The other end of the supply conductor travel path section 124 is likewise led into the connection box 216 and there connected to the second supply conductor feed section 176, which connects the supply conductor travel path section 124 to the second output 166 of the medium frequency generator 162.

A large portion of the first supply conductor feed section 156 and a large portion of the second supply conductor feed section 176 are run together in a multicore supply cable 212.

Otherwise, the sixth embodiment of a transport system 100 shown in FIG. 12 is the same with respect to its structure and function as the fifth embodiment shown in FIG. 11, and reference is made to the above description thereof on this basis.

Figure 13:
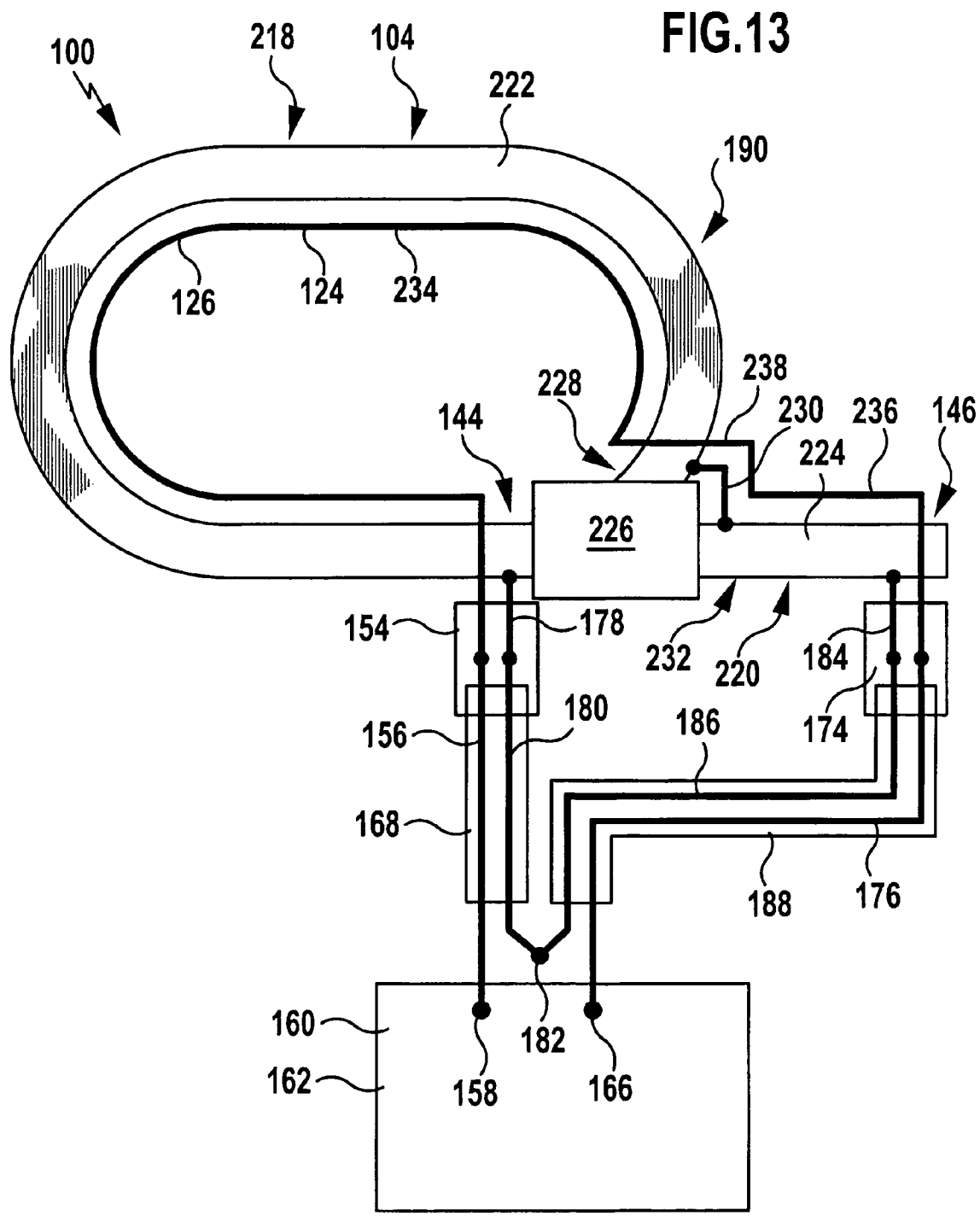
FIG. 13 is a schematic representation of a seventh embodiment of the transport system according to the invention, which comprises a set of points and a branch point.

A seventh embodiment of a transport system 100 according to the invention shown in FIG. 13 differs from the fourth embodiment shown in FIG. 10 in that the travel path 102 of the transport system 100 is not unbranched, but is branched and comprises a, for example, linear, side travel path section 220 besides a curved main travel path section 218.

Accordingly, the travel rail 104 also has a curved main rail section 222 and a, for example, rectilinear, side rail section 224.

Through a points region 226, a first end region 144 of the main rail section 222 can be selectively connected to the side rail section 224 or to the opposed second end region 228 of the main rail section 222.

Such a points region 226 is known per se from the prior art, and therefore will not be described in detail at this point. Such a points region can be configured in particular as an "active set of points" with a movable rail section, as is known, for example, from DE 33 02 266 C2.

If the transport carriage of the transport system 100 has two energy transmission units 138, the distance between which along the travel path is greater than the length of the movable rail section of the points, then it is not necessary to lay a supply conductor in the points region, as is described in the German Patent Application No. 101 59 678.2 of Dürr Automotion GmbH.

As may be seen from FIG. 13, the second end 228 of the main rail section 22 is connected via a connection line 230 to a first end region 232 of the side rail section 224 adjoining the points region 226.

The first end region 144 of the main rail section 222 is connected via a first connection section 178, which is led into a first connection box 154, to a first short-circuit conductor section 180, which connects the first connection section 178 to a contact point 182, which is arranged in the vicinity of the outputs 158 and 166 of the medium frequency generator 162 serving as energy source 160 of the transport system 100.

The second end region 246 of the side rail section 224 facing away from the points region 226 is connected via a second connection section 184, which is led into a second connection box 174, to a second short-circuit conductor section 186, which connects the second connection section 184 to the contact point 182.

The main rail section 222, the connection line 230 and the side rail section 224 therefore together form an induction conductor 190 of the transport system 100, the end regions 144, 146 of which are short-circuited to one another by means of a short-circuit conductor 192, which comprises the connection sections 178, 184, the short-circuit conductor sections 180, 186 and the contact point 182.

The supply conductor travel path section 124 of the seventh embodiment of the transport system 100 comprises a supply conductor main travel path section 234, which extends from the first end region 144 of the main rail section 222 along the main rail section 222 to its second end region 228, a supply conductor side travel path section 236, which extends from the first end region 232 of the side rail section 224 along the side rail section 224 as far as its second end region 146, and a supply conductor travel path connection section 238, which connects an end of the supply conductor main travel path section 234 lying in the second end region 228 of the main rail section 222 to an end of the supply conductor side travel path section 236 lying in the first end region 232 of the side rail section 224.

The end of the supply conductor main travel path section 234 lying in the first end region 144 of the main rail section 222 is led into the first connection box 154, and there is connected to a first connection conductor feed section 156, which connects the supply conductor main travel path section 234 to a first output 158 of the medium frequency generator 162.

The end of the supply conductor side travel path section 236 lying in the second end region 146 of the side rail section 224 is led into the second connection box 174, and there is connected to a second supply conductor feed section 176, which connects the supply conductor side travel path section 236 to a second output 166 of the medium frequency generator 162.

A large portion of the first supply conductor feed section 156 and a large portion of the first short-circuit conductor section 180 are run together in a multicore first supply cable 168.

A large portion of the second supply conductor feed section 176 and a large portion of the second short-circuit conductor section 186 are run together in a multicore second supply cable 188.

As a result of the alternating current fed into the connection conductor 126 of the transport system 100 by the medium frequency generator 162, an induction current having a smaller amplitude than the current impressed in the supply conductor 126 is generated in the induction conductor 190 of the transport system 100, which is short-circuited by means of the short-circuit conductor 192.

Otherwise, the seventh embodiment of the transport system 100 according to the invention shown in FIG. 13 is the same with respect to its structure and function as the fourth embodiment shown in FIG. 10, and reference is made to the above description thereof on this basis.

Figure 14:
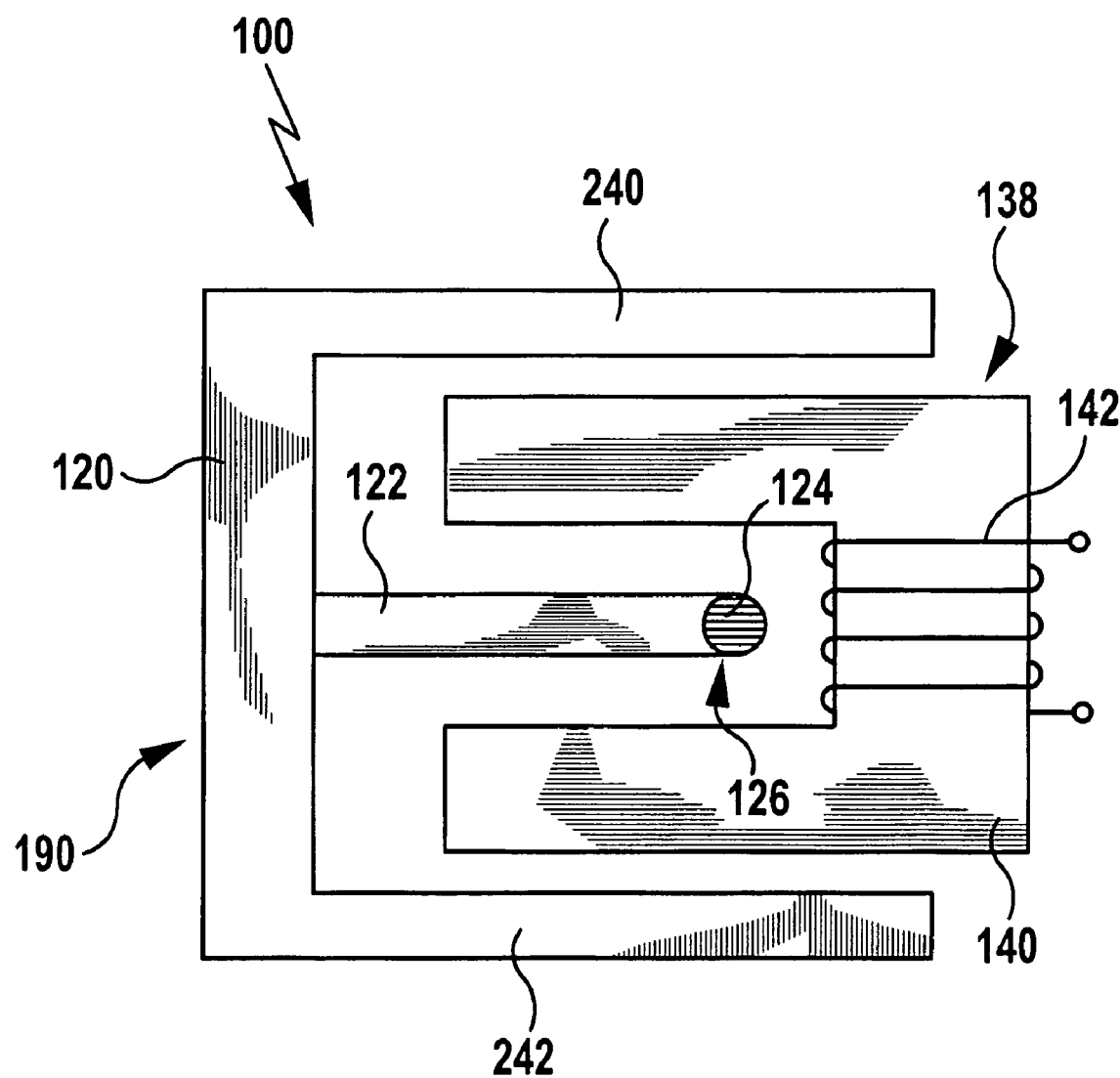
FIG. 14 shows a schematic cross-section through the induction conductor, the supply conductor and an energy transmission unit of an eighth embodiment of the transport system according to the invention.

An eighth embodiment of the transport system 100 according to the invention shown in FIG. 14 differs from the above-described first to seventh embodiments in that a travel rail 104 of the transport system 100 is not used as the induction conductor 190, but rather the induction conductor 190 is configured as a separate element of the transport system 100 other than the travel rail 104.

As may be seen from FIG. 14, the induction conductor can be configured in particular as a profile element extending along the travel path 102 with an essentially U-shaped cross-section, which is made from an electrically conductive, non-ferromagnetic material, in particular from aluminium or an aluminium alloy.

A upper leg 240 and a lower leg 242 of the induction conductor are connected to one another by a web 120.

Projecting from a side wall of the web 120 is a supply conductor support 122, which is formed from an electrically conductive material and which supports the supply conductor travel path section 124 of the supply conductor 126 at its end directed away from the web 120.

As may be seen from FIG. 14, in this embodiment the supply conductor travel path section 124 is arranged essentially centrally between the two legs 240, 242 of the induction conductor 190, which leads to a particularly low inductance of the conductor arrangement comprising the supply conductor travel path section 124 and the induction conductor 190.

The essentially U-shaped current collector 140 of the energy transmission unit 138 of the transport carriage penetrates into the region between the two legs 240, 242 of the induction conductor 190 and surrounds the supply conductor travel path section 124 without touching this.

The current collector, which is configured as a U-shaped ferrite core, carries an induction coil 142, which is connected to a current collector electronic circuit (not shown in FIG. 14) for conversion of an alternating current induced in the conductor coil 142 into a direct current voltage.

In this embodiment, the (not shown) support rollers and guide rollers of the transport carriage of the transport system 100 do not run on the induction conductor 190, but on one or more separately formed rails (not shown) other than the induction conductor 190.

Otherwise, the embodiment of the transport system 100 according to the invention shown in FIG. 14 is the same with respect to its structure and function as the embodiments described in FIGS. 5 to 13, and reference is made to the above description thereof on this basis.

In particular, as in the case of the above embodiments, the induction conductor 190 in the eighth embodiment can be divided into several induction conductor sections and/or have a curved course. The supply conductor 126 and the short-circuit conductor 192 in the eighth embodiment can also be formed in the same manner as in any of the above-described first to seventh embodiments.

The invention claimed is:

1. Transport system comprising a conductor system, which comprises at least one supply conductor, which is connected to an energy source, at least one transport carriage movable along a travel path relative to the conductor system and at least one device for the non-contact transmission of energy from the conductor system to the transport carriage,
    wherein the transport system comprises at least one induction conductor, which at least in sections is arranged so closely adjacent to the supply conductor that an electric current flowing in the supply conductor generates an induction current in the induction conductor,
    wherein the induction conductor has at least two end regions, which are short-circuited to one another, and/or wherein the induction conductor is closed in a ring shape, and
    wherein the supply conductor comprises a supply conductor travel path section, which runs essentially along the travel path, and
    wherein the induction conductor runs along the supply conductor travel path section at least in sections.

2. Transport system according to claim 1, wherein two end regions of the induction conductor are short-circuited to one another by means of a short-circuit conductor.

3. Transport system according to claim 2, wherein the short-circuit conductor comprises a first short-circuit conductor section and a second short-circuit conductor section, which are connected to one another at a contact point remote from the energy source.

4. Transport system according to claim 3, wherein the supply conductor comprises a first supply conductor feed section with a lower section, which runs from the region of the contact point to a first output of the energy source.

5. Transport system according to claim 4, wherein the lower section of the first supply conductor feed section and the lower section of the second supply conductor feed section are run together in a multicore supply cable at least in sections.

6. Transport system according to claim 3, wherein the supply conductor comprises a second supply conductor feed section with a lower section, which runs from the region of the contact point to a second output of the energy source.

7. Transport system according to claim 1, wherein the supply conductor comprises a first supply conductor feed section, which connects the supply conductor travel path section to a first output of the energy source.

8. Transport system according to claim 7, wherein the short-circuit conductor comprises a first short-circuit conductor section, which runs along the first supply conductor feed section at least in sections.

9. Transport system according to claim 8, wherein the first supply conductor feed section and the first short-circuit conductor section are run together in a multicore supply cable at least in sections.

10. Transport system according to claim 9, wherein the first supply conductor feed section is run in at least two wires of the multicore supply cable, and that the first short-circuit conductor section is run in at least one wire of the multicore supply cable, which—viewed in the peripheral direction of the supply cable—is arranged between the two wires, in which the first supply conductor feed section is run.

11. Transport system according to claim 9, wherein the first short-circuit conductor section is run in at least two wires of the multicore supply cable, and that the first supply conductor feed section is run in at least one wire of the multicore supply cable, which—viewed in the peripheral direction of the supply cable—is arranged between the two wires, in which the first short-circuit conductor section is run.

12. Transport system according to claim 7, wherein the supply conductor comprises a second supply conductor feed section, which connects the supply conductor travel path section to a second output of the energy source.

13. Transport system according to claim 12, wherein the short-circuit conductor comprises a second short-circuit conductor section, which runs along the second supply conductor feed section at least in sections.

14. Transport system according to claim 13, wherein the second supply conductor feed section and the second short-circuit conductor section are run together in a multicore supply cable at least in sections.

15. Transport system according to claim 14, wherein the second supply conductor feed section is run in at least two wires of the multicore supply cable, and that the second short-circuit conductor section is run in at least one wire of the multicore supply cable, which—viewed in the peripheral direction of the supply cable—is arranged between the two wires, in which the second supply conductor feed section is run.

16. Transport system according to claim 12, wherein the second short-circuit conductor section is run in at least two wires of the multicore supply cable, and that the second supply conductor feed section is run in at least one wire of the multicore supply cable, which—viewed in the peripheral direction of the supply cable—is arranged between the two wires, in which the second supply conductor section is run.

17. Transport system according to claim 13, wherein the first short-circuit conductor section and the second short-circuit conductor section are connected to one another in the vicinity of the energy source.

18. Transport system according to claim 1, wherein the induction conductor comprises a plurality of induction conductor sections, which respectively have at least two end regions, wherein at least one end region of a first induction conductor section is electrically conductively connected to at least one end region of a second induction conductor section.

19. Transport system according to claim 18, wherein the at least one end region of the first induction conductor section is electrically conductively connected to the at least one end region of the second induction conductor section via a separate connection line.

20. Transport system according to claim 18, wherein the at least one end region of the first induction conductor section is electrically conductively connected to the at least one end region of the second induction conductor section via an electrically conductive mounting.

21. Transport system according to claim 18, wherein each end region of each induction conductor section is electrically conductively connected to at least one end region of the same induction conductor section or another induction conductor section.

22. Transport system according to claim 1, wherein the induction conductor and the supply conductor are electrically separated from one another.

23. Transport system according to claim 1, wherein the induction conductor comprises an element, which is configured at least in sections as a profile element.

24. Transport system according to claim 23, wherein at least in sections the profile element has a substantially U-shaped cross-section or an essentially double-T-shaped cross-section.

25. Transport system according to claim 1, wherein the induction conductor comprises an element, which is configured at least in sections as a travel rail, on which the transport carriage of the transport system is arranged.

26. Transport system according to claim 1, wherein the induction conductor comprises an element, which at least in sections is formed from aluminium or an aluminium alloy.

27. Transport system according to claim 1, wherein the conductor system of the transport system has no return conductor.

28. Transport system according to claim 1, wherein the energy source comprises a medium frequency generator.

29. Transport system comprising a conductor system, which comprises at least one supply conductor, which is connected to an energy source, at least one transport carriage movable along a travel path relative to the conductor system and at least one device for the non-contact transmission of energy from the conductor system to the transport carriage,
  wherein the transport system comprises at least one induction conductor, which at least in sections is arranged so closely adjacent to the supply conductor that an electric current flowing in the supply conductor generates an induction current in the induction conductor, wherein the induction conductor has at least two end regions, which are short-circuited to one another by means of a short-circuit connector,
  wherein the supply conductor comprises a first supply conductor feed section, which connects the supply conductor travel path section to a first output of the energy source, and
  wherein the short-circuit conductor comprises a first short-circuit conductor section, which runs along the first supply conductor feed section at least in sections.

30. Transport system comprising a conductor system, which comprises at least one supply conductor, which is connected to an energy source, at least one transport carriage movable along a travel path relative to the conductor system and at least one device for the non-contact transmission of energy from the conductor system to the transport carriage,
  wherein the transport system comprises at least one induction conductor, which at least in sections is arranged so closely adjacent to the supply conductor that an electric current flowing in the supply conductor generates an induction current in the induction conductor,
  wherein the induction conductor has at least two end regions, which are short-circuited to one another, and/or wherein the induction conductor is closed in a ring shaped, and
  wherein the induction conductor comprises an element, which is configured at least in sections as a travel rail on which the transport carriage of the transport system is arranged.

31. Transport system comprising a conductor system, which comprises at least one supply conductor, which is connected to an energy source, at least one transport carriage movable along a travel path relative to the conductor system and at least one device for the non-contact transmission of energy from the conductor system to the transport carriage,
  wherein the transport system comprises at least one induction conductor, which at least in sections is arranged so closely adjacent to the supply conductor that an electric current flowing in the supply conductor generates an induction current in the induction conductor,
  wherein the induction conductor has at least two end regions, which are short-circuited to one another, and/or wherein the induction conductor is closed in a ring shaped, and
  wherein the induction conductor comprises an element, which at least in sections is formed from aluminium or an aluminium alloy.

* * * * *

UNITED STATES PATENT AND TRADEMARK OFFICE
CERTIFICATE OF CORRECTION

PATENT NO. : 7,511,250 B2  Page 1 of 1
APPLICATION NO. : 11/298638
DATED : March 31, 2009
INVENTOR(S) : Erik Lindig It is certified that error appears in the above-identified patent and that said Letters Patent is hereby corrected as shown below:

Col. 16, Claim 16, line 1, please change "claim 12" to --claim 14--.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,511,250 B2 |
| APPLICATION NO. | : 11/298638 |
| DATED | : March 31, 2009 |
| INVENTOR(S) | : Erik Lindig |

It is certified that error appears in the above-identified patent and that said Letters Patent is hereby corrected as shown below:

Col. 16, Claim 16, line 32, please change "claim 12" to --claim 14--.

This certificate supersedes the Certificate of Correction issued August 4, 2009.

Signed and Sealed this

Twenty-fifth Day of August, 2009

David J. Kappos
*Director of the United States Patent and Trademark Office*